United States Patent
Yamanaka et al.

(10) Patent No.: US 8,078,362 B2
(45) Date of Patent: Dec. 13, 2011

(54) ELECTROSTATIC SEAT OCCUPANT DETECTION SYSTEM

(75) Inventors: Shoichi Yamanaka, Anjo (JP); Tsutomu Kamizono, Nagoya (JP); Masahiro Ishikawa, Toyohashi (JP)

(73) Assignee: Denso Corporation, Kariya (JP)

( * ) Notice: Subject to any disclaimer, the term of this patent is extended or adjusted under 35 U.S.C. 154(b) by 409 days.

(21) Appl. No.: 12/316,754

(22) Filed: Dec. 16, 2008

(65) Prior Publication Data

US 2009/0164070 A1    Jun. 25, 2009

(30) Foreign Application Priority Data

Dec. 20, 2007   (JP) .................................. 2007-329257

(51) Int. Cl.
  *B60R 22/00*    (2006.01)
(52) U.S. Cl. ......................................... 701/45; 340/602
(58) Field of Classification Search .................... 701/45; 180/274, 282; 280/735; 340/425.5, 602
See application file for complete search history.

(56) References Cited

U.S. PATENT DOCUMENTS

| | | | |
|---|---|---|---|
| 5,738,107 A | 4/1998 | Martinsen et al. | |
| 2005/0275202 A1 | 12/2005 | Wato et al. | |
| 2006/0219460 A1 | 10/2006 | Wanami | |
| 2006/0284731 A1 | 12/2006 | Ando et al. | |
| 2007/0182553 A1 | 8/2007 | Kamizono et al. | |

FOREIGN PATENT DOCUMENTS

| | | |
|---|---|---|
| JP | 11-271463 | 10/1999 |
| JP | 2006-027591 | 2/2006 |
| JP | 2006-281990 | 10/2006 |
| JP | 2006-347329 | 12/2006 |
| JP | 2007-240515 | 9/2007 |

OTHER PUBLICATIONS

Office Action dated Sep. 3, 2009 in corresponding Japanese Application No. 2007-329257.

*Primary Examiner* — Eric Culbreth
(74) *Attorney, Agent, or Firm* — Harness, Dickey & Pierce, PLC

(57) ABSTRACT

An electrostatic seat occupant detecting system of a vehicle has a vehicle body and a seat. The electrostatic seat occupant detecting system includes an antenna unit that includes a main electrode and a sub-electrode disposed near the main electrode, an AC power source, a switch unit for switching supply of AC voltage to the antenna unit to form one of a first electric field between the vehicle body and the main electrode thereby providing a seat-occupant detecting mode and a second electric field between the main electrode and the sub-electrode thereby providing a wet condition detecting mode, and a seat-occupant detecting ECU. The above seat-occupant detecting ECU includes an admittance calculating section that calculates a first admittance of the first electric field and a second admittance of the second electric field, a conductance susceptance separating section that separates conductance of the first and second admittance from the susceptance of the first and second admittances, a water content estimating section that estimates an amount of water content of the seat based on the conductance and the susceptance of the second admittance, and a judging section that judges whether a seat occupant is present or not based on one of the conductance and susceptance of the first admittance and the estimated amount of the water content of the seat.

4 Claims, 7 Drawing Sheets

ELECTROSTATIC SEAT OCCUPANT DETECTION SYSTEM

CROSS REFERENCE TO RELATED APPLICATION

The present application is based on and claims priority from Japanese Patent Application 2007-329257, filed Dec. 20, 2007, the contents of which are incorporated herein by reference.

BACKGROUND OF THE INVENTION

1. Field of the Invention

The present invention relates to a seat occupant detection system of a vehicle that is used in a passenger protection system.

2. Description of the Related Art

JP-A-11-271463 discloses an electrostatic seat occupant detection system that employs a capacitance sensor and a passenger detecting ECU. The capacitance sensor provides an output signal as an amount of current or a level of voltage when an electric field between a main electrode and a vehicle body changes.

However, such an occupant detection system may not operate accurately if a seat of a vehicle gets wet with water because the state of the electric field is considerably affected by water.

JP-A-2006-27591 or its counterpart US 2005/0275202 A1 discloses another occupant detection system that warns a driver of an abnormality and carries out an abnormality process when a seat gets wet. However, it is not possible for this system to accurately detect a seat occupant if a seat of a vehicle gets wet.

SUMMARY OF THE INVENTION

Therefore, an object of the invention is to provide an improved occupant detection system that can accurately detect a seat occupant even if a seat of a vehicle gets wet.

According to a feature of the invention, an electrostatic seat occupant detecting system includes an antenna unit that includes a main electrode and a sub-electrode disposed side by side, an electric power source for supplying AC voltage to the antenna unit, a switch unit for switching supply of the AC voltage to the antenna unit to selectively form a first electric field between the vehicle body and the main electrode thereby providing a seat-occupant detecting mode or a second electric field between the main electrode and the sub-electrode thereby providing a wet condition detecting mode, and a seat-occupant detecting ECU that includes an admittance calculating section that calculates a first admittance of the first electric field and a second admittance of the second electric field, a conductance-susceptance separating section that separates conductance of the first and second admittance from the susceptance of the first and second admittances, a water content estimating section that estimates an amount of water content of the seat based on the conductance and the susceptance of the second admittance, and a judging section that judges whether a seat occupant is present or not based on one of the conductance and susceptance of the first admittance and the estimated amount of the water content of the seat.

According to the above feature of the invention, a seat occupant can be accurately detected even if the seat gets wet with fresh water or salt water.

In the above electrostatic seat occupant detection system, assuming that: the amount of water content is L; the conductance of the second admittance is Re; and the susceptance of the second admittance is Im, the amount of water content L is calculated according to the following expression: $L=(Re^2+Im^2)^{1/2}$. The antenna unit may further includes a guard electrode disposed between a seat-cushion frame and the main electrode so as to confront the main electrode, and the guard electrode has the same potential level as the main electrode. The judging section may provide a threshold line that is a function of one of the conductance and the susceptance of the first admittance and judges that an adult is seated on the seat when the amount of water content estimated by the water content estimating section falls below the threshold line. The judging section judges whether a seat occupant is present or not based on the conductance of the first admittance and provides a threshold plane that is a function of the conductance and the susceptance of the first admittance. The judging section judges that an adult is seated on the seat when the amount of water content estimated by the water content estimating section falls below the threshold plane.

According to another feature of the invention, a passenger protection system includes the electrostatic seat occupant detection system as stated above, an airbag ECU and an airbag unit. In the passenger protection system, the airbag ECU operates the airbag unit according to the result of judgment by the judging section of the above stated occupant detection system.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A vehicle occupant detection system according to a preferred embodiment of the present invention will be described with reference to the appended drawings.

Figure 1:
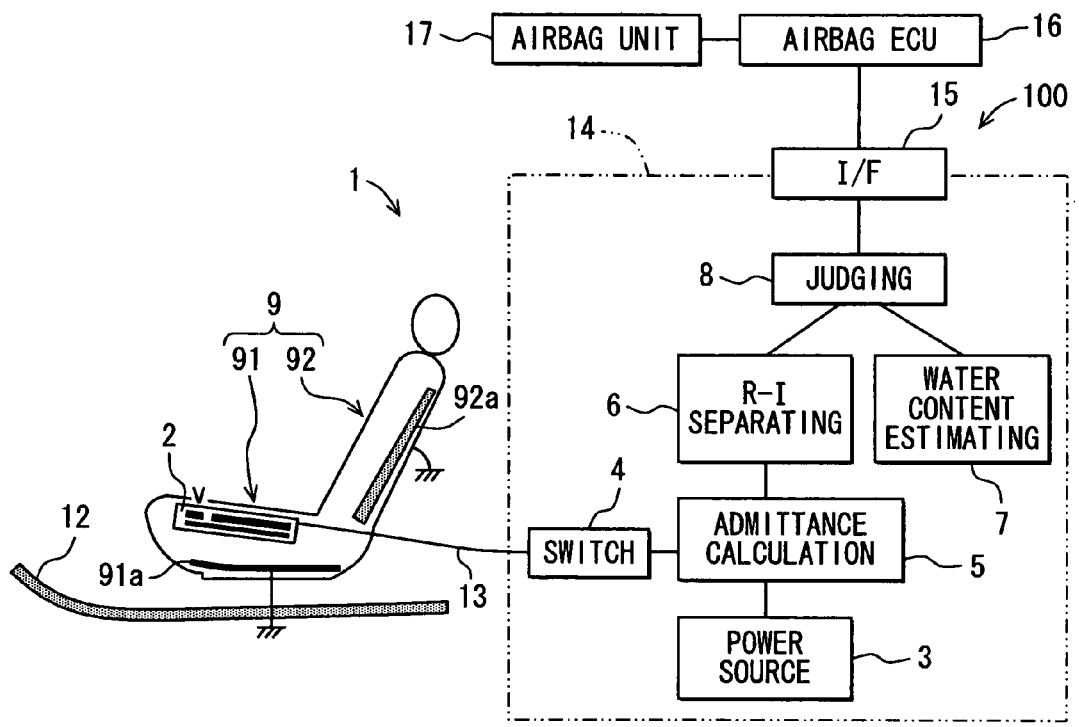
FIG. 1 is a schematic diagram illustrating an electrostatic seat occupant detection system according to a preferred embodiment of the invention.

A passenger protection system 100 is shown in FIG. 1. The passenger protection system 100 includes an electrostatic seat occupant detection system 1, a communication interface 15, an airbag ECU 16, and an airbag unit 17.

As shown in FIG. 1, the seat occupant detection system 1 includes an antenna 2, a vehicle seat 9, a connecting cable 13, and an occupant detecting ECU 14. The antenna 2, the vehicle seat 9 and the cable 13 form an occupant detecting circuit. The vehicle seat 9 includes a seat cushion 91 in which a seat-cushion frame 91a is disposed and a seat back 92 in which a seat-back frame 92a is disposed. The seat-cushion frame 91a and the seat-back frame 92a are electrically connected with a vehicle body 12 to provide a body earth or a ground level.

The antenna 2 is disposed between a seat cover and a cushion member of the seat-cushion 91 so as to confront the seat-cushion frame 91a. The antenna 2 includes a main electrode 21 and a sub electrode 22 which are disposed on the seat-cover side and a guard electrode 23 which is disposed on the cushion-member side.

The main electrode 21 and sub electrode 22 are disposed side by side at a prescribed distance, and the guard electrode 23 is disposed between the main electrode 21 and the seat-cushion frame 91a so as to confront the main electrode 21. The connecting cable 13 may be a wire harness or the like for connecting the seat occupant detecting ECU 14.

The seat occupant detecting ECU 14 includes an electric power source 3, a switch unit 4, an admittance calculating section 5, a real-imaginary component separating section 6, a water content estimating section 7 and a judging section 8. The electric power source 3 includes an oscillating circuit that provides alternating voltage of a fixed frequency.

Figure 2:
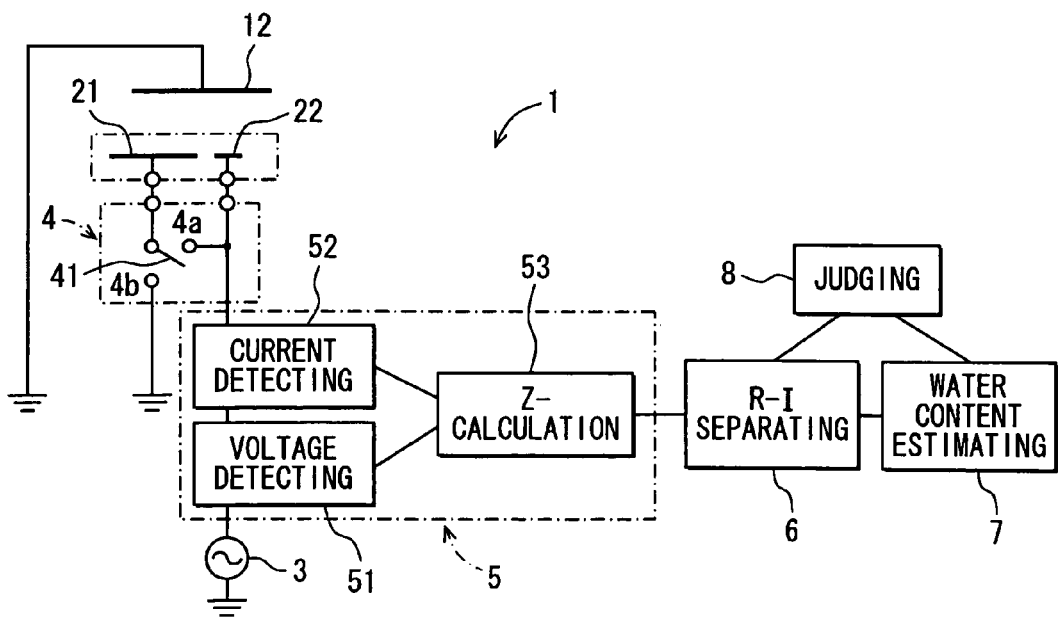
FIG. 2 is a block diagram of the seat occupant detection system according to the preferred embodiment of the invention.

As shown in FIG. 2, the switch unit 4 includes a movable contact 41 and a pair of stationary contacts 4a, 4b.

When the movable contact 41 is brought in contact with the stationary contact 4a, the main and sub electrodes 21, 22 are connected with the electric power source 3 to provide a seat-occupant detecting mode. Therefore, electric fields are formed between the main electrode 21 and the vehicle body 12 that includes the seat-cushion frame 91a and the seat-back frame 92a, and between the sub electrode 22 and the vehicle body 12. In the seat occupant detecting mode, a bias voltage is applied to the guard electrode 23 via an operational amplifier or the like from the power source 3 to put the guard electrode 23 to the same potential level as the main electrode 21.

When the movable contact 41 is brought in contact with the other stationary contact 4b, the main electrode 21 and the guard electrode 23 are body-earthed or grounded, and only the sub electrode 22 is connected with the electric power source 3. Accordingly, an electric field is formed between the sub electrode 22 and the main electrode 21 to provide a wet condition detecting mode.

The admittance calculating section 5 is connected with the electric power source 3, the switch unit 4 and the real-imaginary component separating section 6. The admittance calculating section 5 includes a voltage detecting circuit 51, a current detecting circuit 52 and a Z-value (or an impedance) calculating section 53. The voltage detecting circuit 51 is connected with the electric power source 3 to detect the amplitude of alternating voltage applied across the electric power source and the switch unit 4, and the current detecting circuit 52 detects the amount of current flowing in a circuit formed between the electric power source 3 and the switch unit 4.

The Z-value calculating section 53 is connected with the voltage detecting circuit 51, the current detecting 52 and the real-imaginary component separating section 6. The Z-value calculating section 53 calculates an admittance (i.e. Y=1/Z) of the occupant detecting circuit, which includes the antenna 2, the seat 9 and the switch unit 4, from the amplitude of the voltage detected by the voltage detecting circuit 51 and the amount of current detected by the current detecting circuit 52. When the seat occupant detecting mode is provided, the Z-value calculating section 53 calculates a first admittance $Y_1$. On the other hand, the Z-value calculating section 53 calculates a second admittance $Y_2$ when the wet condition detecting mode is provided.

The first admittance changes as the impedance between a unit of the main and sub electrodes 21, 22 and the vehicle body 12 changes, and the second admittance changes as the impedance between the sub electrode 22 and the main electrode 21.

The real-imaginary component separating section 6 is connected with the admittance calculating section 5, the water content estimating section 7 and the judging section 8. The real-imaginary component separating section 6 calculates a conductance and a susceptance from the admittance that is calculated by the admittance calculating section 5. In more detail, the real-imaginary component separating section 6 calculates the conductance and the susceptance of the first admittance $Y_1$ when the occupant detecting mode is provided and also the conductance and the susceptance of the second admittance $Y_2$ when the wet condition detecting mode is provided.

The water content estimating section 7 is connected with the real-imaginary separating section 6 and the judging section 8. The water content estimating section 7 estimates an amount of the water content of the seat based on the conductance and susceptance of the second admittance $Y_2$ that is calculated by the real-imaginary component separating section 6. The amount of the water content is represented by the second admittance $Y_2$.

The judging section 8 is connected with the real-imaginary component separating section 6 and the water content estimating section 7. The judging section 8 judges whether a seat occupant is present or not based on the conductance and susceptance of the first admittance $Y_1$ and the estimated water content of the seat.

The result of the judgment is sent via the communication interface 15 to the airbag ECU 16. The airbag ECU 16 controls the airbag unit 17 based on the result of the judgment. In other words, the airbag ECU 16 determines whether to permit operation of the air bag unit 17 or not. If it is judged that the seat occupant is an adult, the operation is permitted. In this case, the airbag ECU 16 operates the airbag unit 17 if a collision is detected by an acceleration sensor (not shown). On the other hand, the airbag ECU 16 does not permit operation of the airbag unit 17 if it is judged that the seat is vacant or that the seat occupant is a child or a child restraint system (CRS).

Incidentally, each of the Z-value calculating section 53, the real-imaginary component separating section 6, the water content estimating section 7 and the judging section 8 is constructed of a processing circuit or a processing program.

Figure 3:
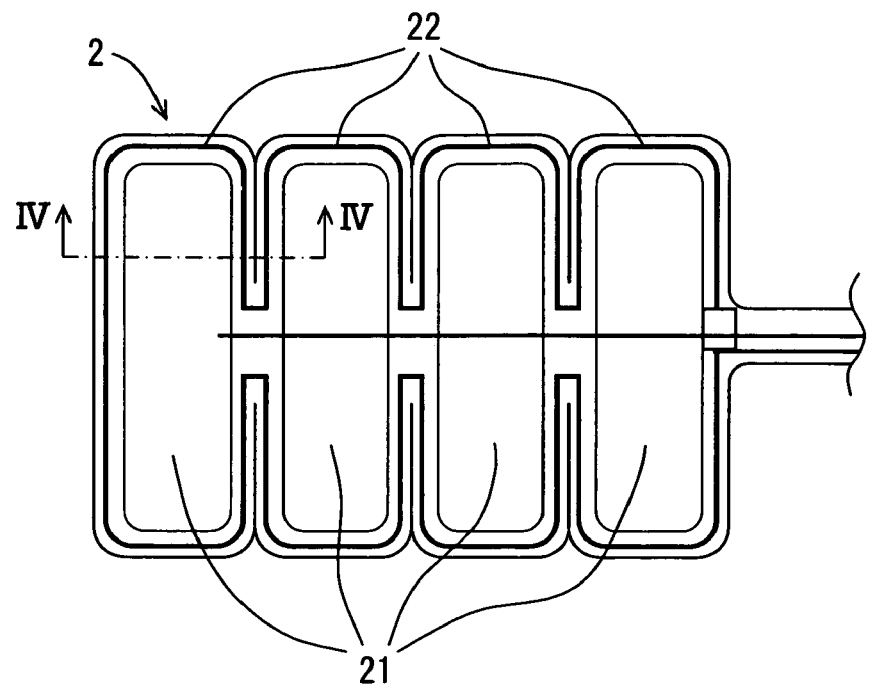
FIG. 3 is a schematic diagram illustrating an antenna 2.

As shown in FIG. 3, the antenna 2 is a unit member that has generally rectangular four antenna sections disposed side by side.

Figure 4:
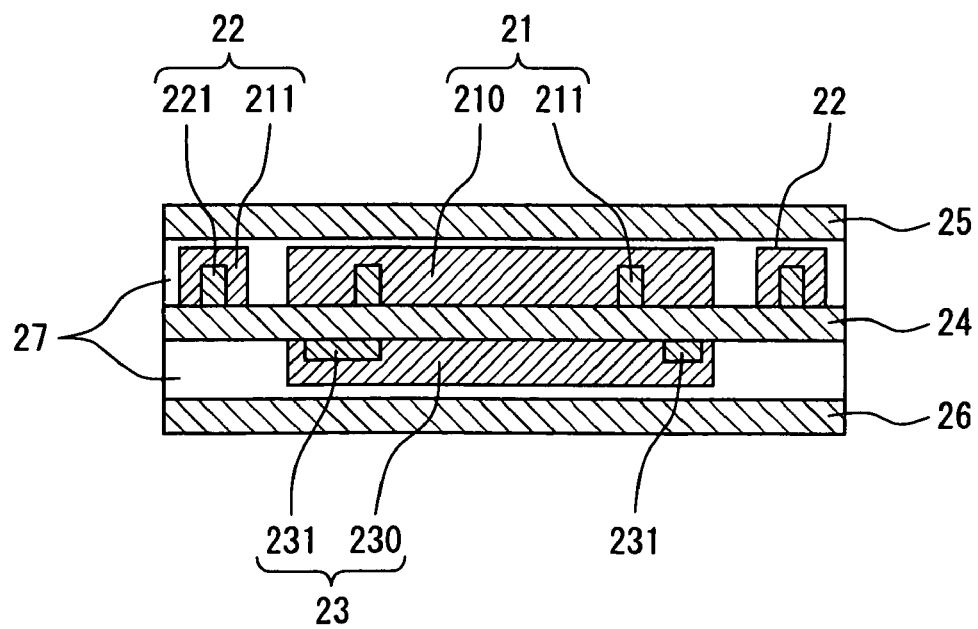
FIG. 4 is a cross-sectional view of the antenna illustrated in FIG. 3 cut along line IV-IV.

As shown in FIG. 4, each section of the antenna 2 is constructed of a portion of the main electrode 21, a portion of the sub electrode 22, a portion of the guard electrode 23, a portion of a base film layer 24, a portion of an upper film layer 25 and a portion of a lower film layer 26.

The base film layer 24, the upper film layer 25 and the lower film layer 26 are made of PET (polyethylene terephthalate) and are bonded to each other by an adhesive agent 27.

The main electrode 21 is constructed of a carbon member 210 and a silver member 211 and is disposed between the upper film layer 22 and the base film layer 24. The carbon member 210 has four electrode sections, each of which is disposed at the central portion of each antenna section and is shaped into a rectangular plate. The silver member 211 is disposed in the carbon member 210 near the peripheral portions thereof.

The sub electrode 22 is constructed of a carbon member 220 and a silver member 221 and is disposed between the upper film layer 22 and the base film layer 24 to surround the main electrode 21. The carbon member 220 also has four electrode sections, each of which is shaped into a rectangular frame that surrounds one of the antenna sections, and the silver member 221 is disposed in the carbon member 220 to extend along the center line thereof.

The guard electrode 23 is constructed of a carbon member 230 and a silver member 231. The guard electrode 23 is disposed between the base film layer 24 and the lower film layer 26 so as to confront the main electrode 21 via the base film layer 24 that is an insulating member. The carbon member 230 has four electrode sections, each of which is disposed at the central portion of each antenna section to confront one of the electrode sections of the main electrode 21 and is shaped into a rectangular plate. The silver member 231 is disposed in the carbon member 230 near the peripheral portions thereof.

Figure 5:
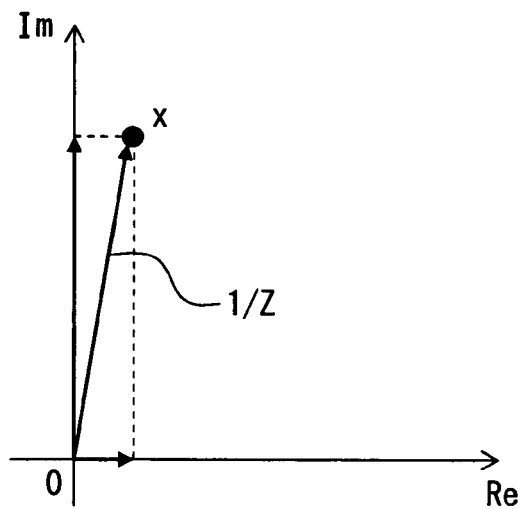
FIG. 5 is a graph showing an Im-Re characteristic of an admittance.
Figure 6:
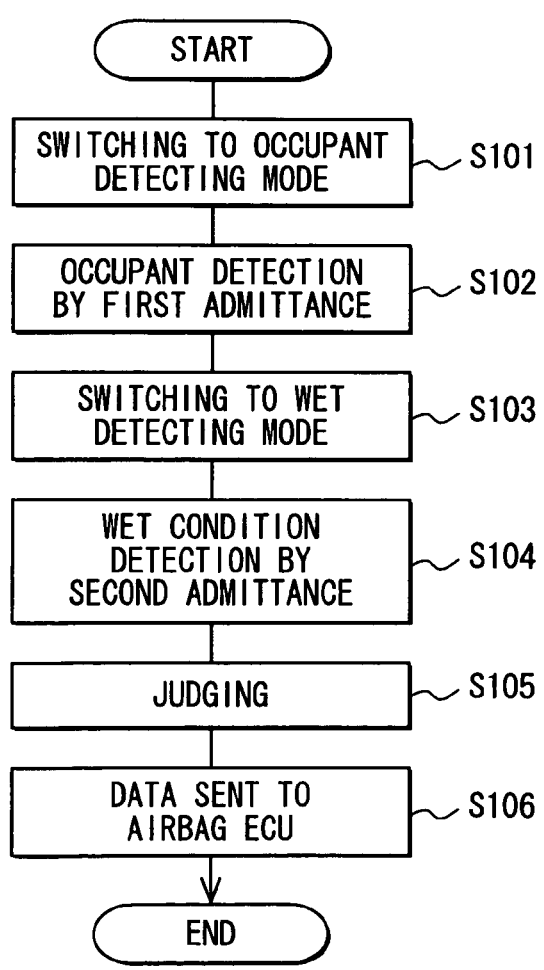
FIG. 6 is a flow diagram of operation of the electrostatic seat occupant detection system.

The operation of the seat occupant detection system 1 will be explained with reference to a vector diagram shown in FIG. 5.

An impedance Z is expressed as follows.

$Z=1/(Re+j \cdot Im)$, in which: Re is a conductance; Im is a susceptance; and j indicates a unit of an imaginary number.

The length Y of vector Z is expressed as follows.

$Y=(Re^2+Im^2)^{1/2}$

At the first step S101, the switch unit 4 connects the main electrode 21 with the stationary contact 4*a* so that an electric field between the unit of the main electrode 21 and the sub electrode 22 and the vehicle body 12 can form, thereby providing the seat occupant detecting mode.

Then, the impedance Za and the first admittance $Y_1$ (which is 1/Za) between the unit of the main electrode 21 and the sub electrode 22 and the vehicle body 12 are calculated by the admittance calculating section 5 at step S102, where the conductance Re and the susceptance Im are separated by the real-imaginary component separating section 6.

Figure 7:
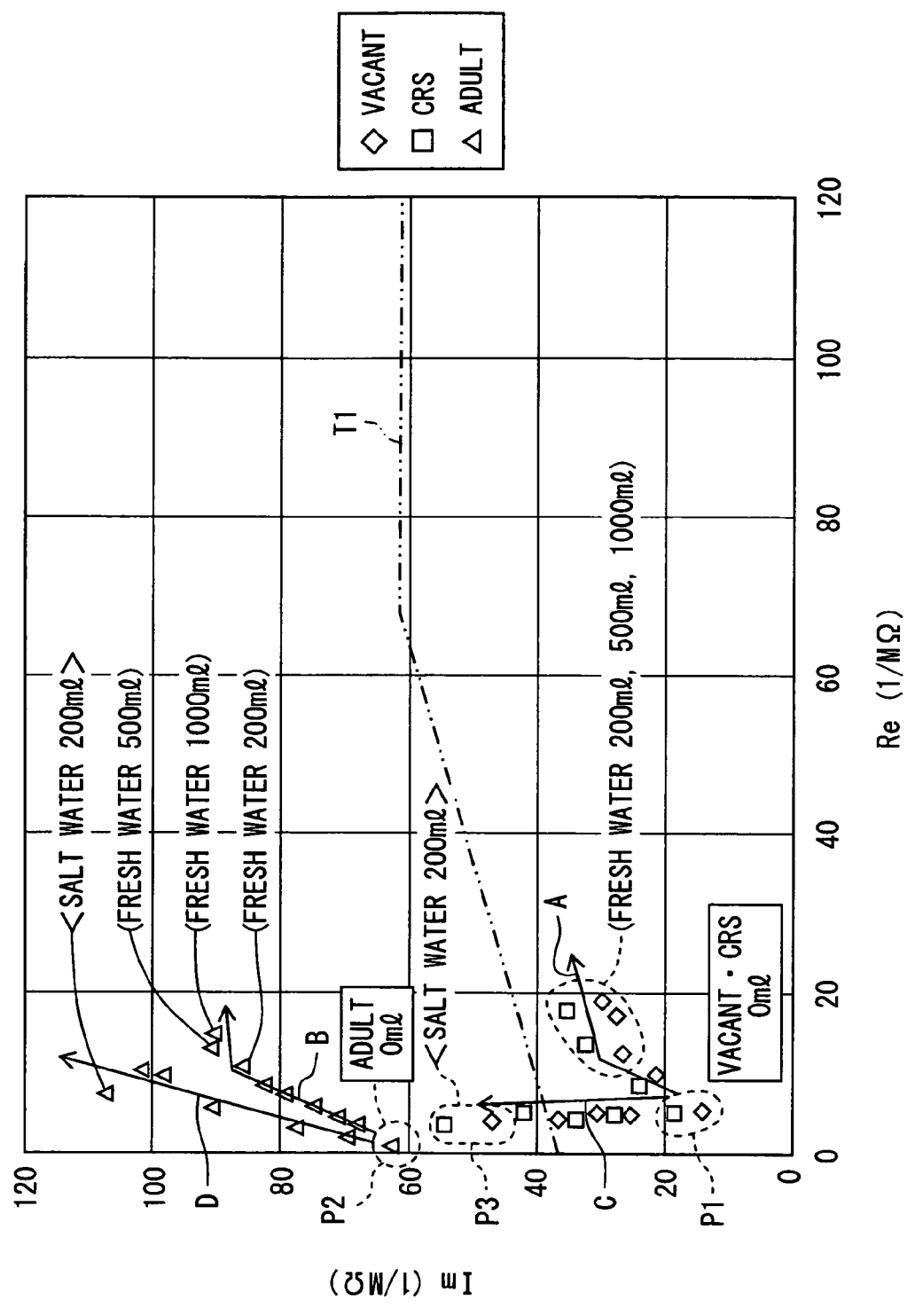
FIG. 7 is a graph showing an Im-Re characteristic of a first admittance.

The first admittance changes according to the state of the seat as shown in a orthogonal coordinate system graph in FIG. 7.

In the case where the seat is dry (i.e. the water content of the seat is zero milliliter): when no adult or only a child restraint system (CRS) is seated, (Re, Im) of the first admittance is positioned at point P1 near (6, 16) in the graph; and when an adult is seated, (Re, Im) is positioned at P2 near (1, 63). Thus, the susceptance of the first admittance $Y_1$ when an adult is seated becomes much larger than the susceptance when no adult is seated. Incidentally, the seat occupant can be detected by examining if the value (Re, Im) is positioned above a two-dot-chain line T or not in the case where the seat is dry.

In the case where the seat gets wet with fresh water: when no adult or only a child restraint system (CRS) is seated, (Re, Im) of the first admittance $Y_1$ is positioned along arrow line A; and when an adult is seated, (Re, Im) of the first admittance $Y_1$ is positioned along arrow line B. It is noted that (Re, Im) of the first admittance does not linearly increase when the water content becomes over 200 ml.

In the case where the seat gets wet with salt water: when no adult or only a child restraint system (CRS) is seated, (Re, Im) of the first admittance $Y_1$ is positioned at point P3, which is near (5, 50) along arrow line C; and when an adult is seated, (Re, Im) of the first admittance is positioned at a point near (7, 107), which is located along arrow line D. It is noted that: the susceptance Im increases as the content of salt water increases; and the point P3 is near point P2. Incidentally, the values (Re, Im) of the first admittance $Y_1$ in the case where the salt water content becomes about 100 ml are respectively (5, 45) when no adult or only a child restraint system (CRS) is seated and (10, 100) when an adult is seated.

In the seat occupant detecting mode, the data (Re, Im) are sent to the judging section 8. Subsequently, the switch unit 4 switches the movable contact 41 from the stationary 4*a* to the stationary contact 4*b* to provide the wet condition detecting mode at S103.

Figure 8:
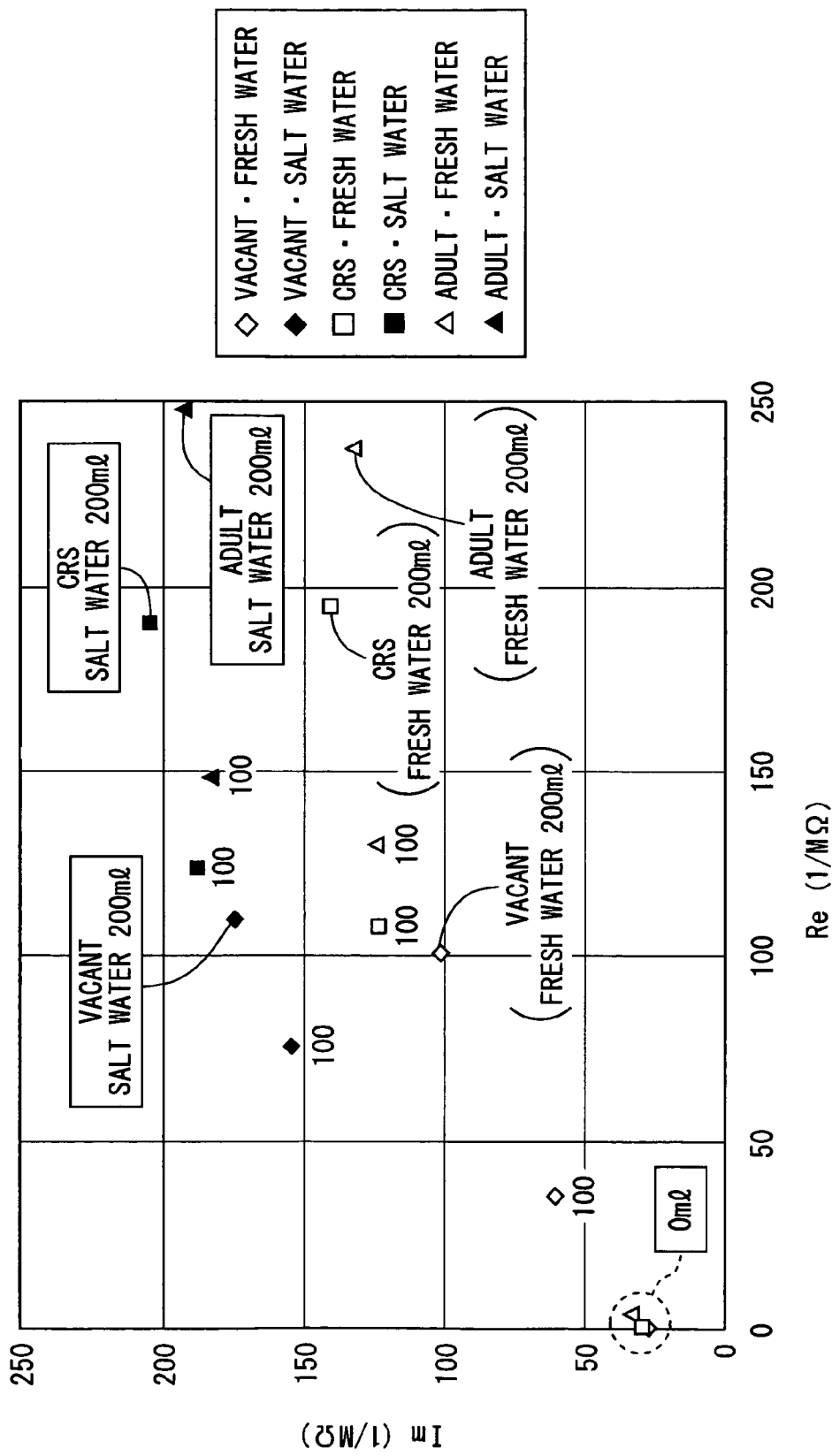
FIG. 8 is a graph showing an Im-Re characteristic of a second admittance.

At the step S104, wet condition is detected according to characteristics of the second admittance $Y_2$ in an orthogonal coordinate system graph shown in FIG. 8.

In the wet condition detecting mode, an electric field is formed between the sub electrode 22 and the main electrode 21. The electric field changes if a portion of the seat cushion 91 in the electric field gets wet.

In the case where the seat is dry (or the water content of the seat is zero milliliter): (Re, Im) of the second admittance $Y_2$ is positioned at a position near (1, 30) in the graph, irrespective of whether an adult or CRS is seated or not.

In the case where the seat gets wet with fresh water of 100 ml: when no adult is seated, (Re, Im) of the second admittance $Y_2$ is positioned near (35, 60); when CRS is seated, (Re, Im) of the second admittance $Y_2$ is positioned near (110, 125); and when an adult is seated, (Re, Im) of the second admittance $Y_2$ is positioned near (130, 125).

In the case where the seat gets wet with fresh water of 200 ml: when no adult is seated, (Re, Im) of the second admittance $Y_2$ is positioned near (100, 100); when CRS is seated, (Re, Im) of the second admittance $Y_2$ is positioned near (195, 140); and when an adult is seated, (Re, Im) of the second admittance $Y_2$ is positioned near (235. 130).

In the case where the seat gets wet with salt water of 100 ml: when no adult is seated, (Re, Im) of the second admittance $Y_2$ is positioned near (75, 155); when CRS is seated, (Re, Im) of the second admittance $Y_2$ is positioned near (125, 190); and when an adult is seated, (Re, Im) of the second admittance $Y_2$ is positioned near (150, 185).

In the case where the seat gets wet with salt water of 200 ml: when no adult is seated, (Re, Im) of the second admittance $Y_2$ is positioned near (110, 175); when CRS is seated, (Re, Im) of the second admittance $Y_2$ is positioned near (190, 205); and when an adult is seated, (Re, Im) of the second admittance $Y_2$ is positioned near (245, 195).

Thus, as the content of fresh or salt water increases, the value (Re, Im) shifts to the right in FIG. 8. It is noted that the water content can be estimated by the distance of the value (Re, Im) from the origin of the orthogonal coordinate system graph shown in FIG. 8.

The water content estimating section 7 estimates a water content L according to the value (Re, Im) of the second admittance $Y_2$. Here, the water content L is expressed as follows: $L=(Re^2+Im^2)^{1/2}$. That is, the water content L is the same as the length of the second admittance $Y_2$.

Figure 9:
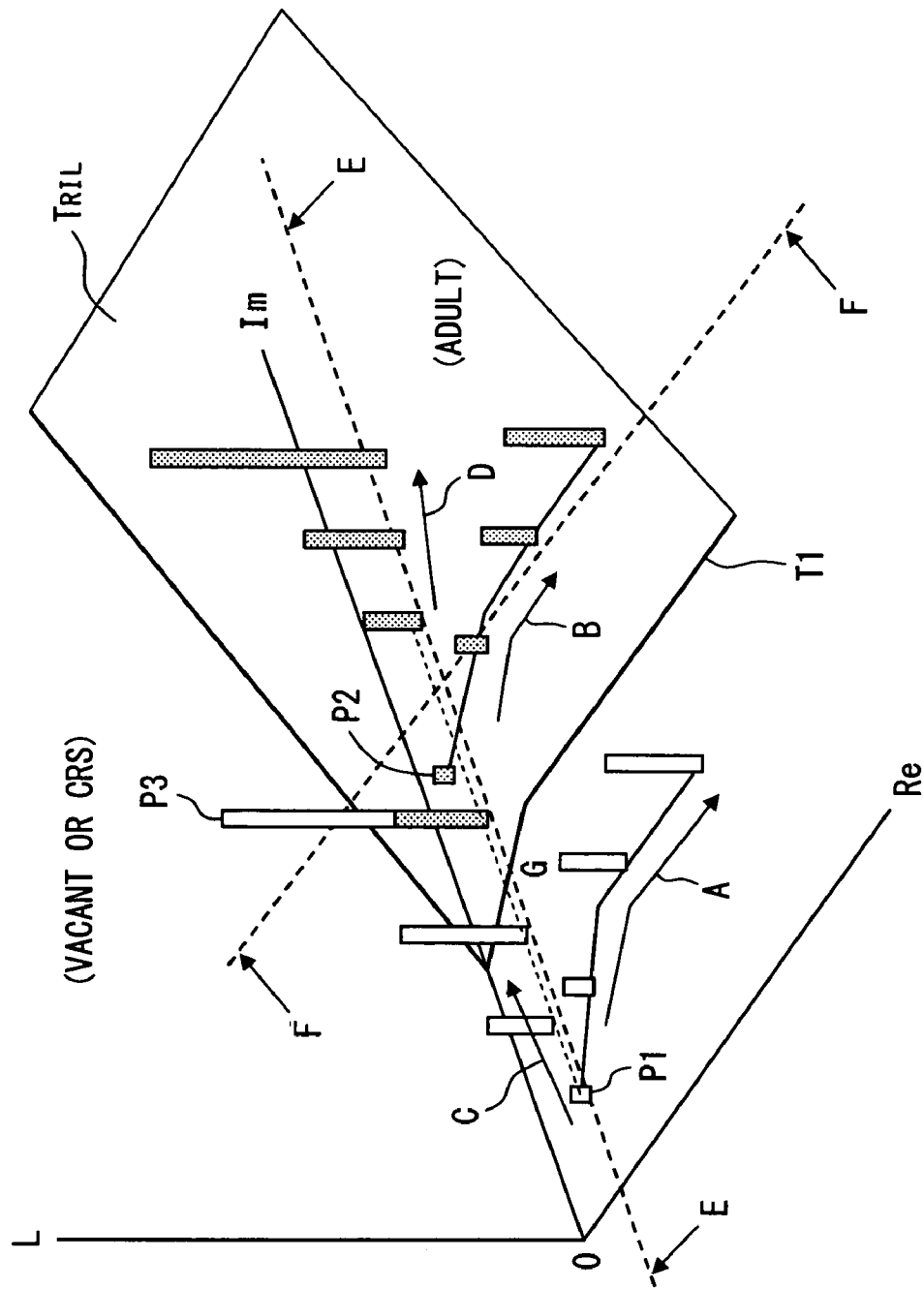
FIG. 9 is a graph showing an Re-Im-Le characteristic.
Figure 10:
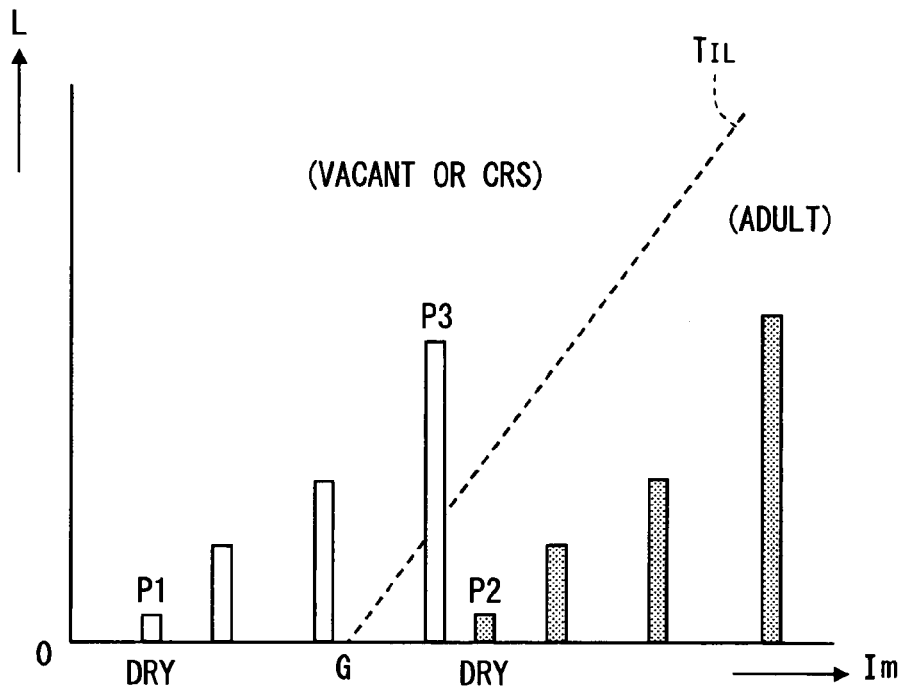
FIG. 10 is a graph showing an Im-L characteristic.
Figure 11:
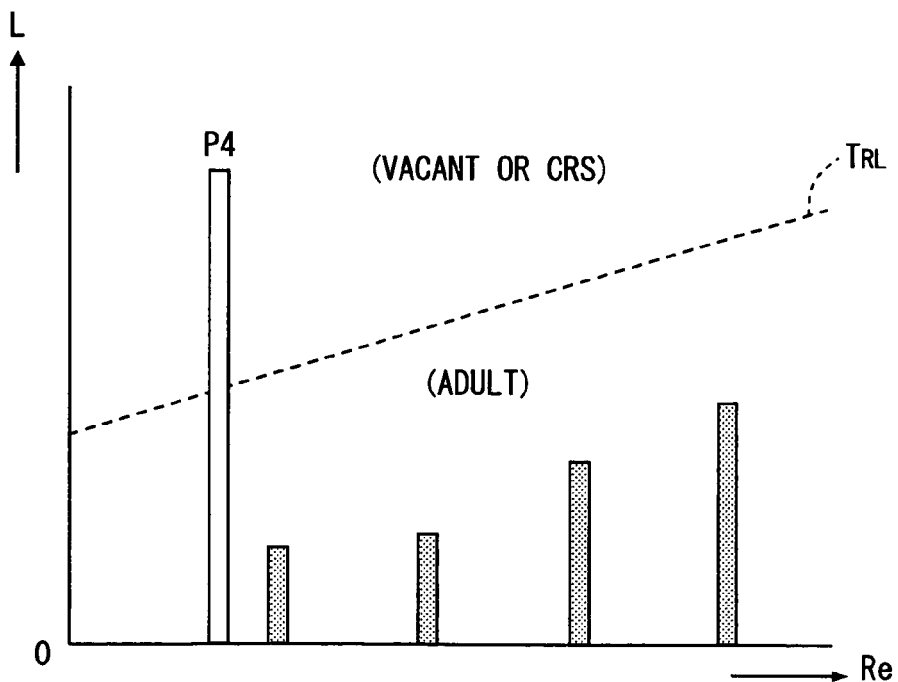
FIG. 11 is a graph showing an Re-L characteristic.

The data of the water content L are sent to the judging section 8, and the occupant detection is carried out at step S105 in a manner described hereafter with reference to FIGS. 9-11.

The judging section 8 judges whether a seat occupant is present or not according to the value (Re, Im) of the second admittance $Y_2$ and the water content L, which can be plotted in a three dimensional orthogonal coordinate system graph shown in FIG. 9.

In FIG. 9, the point P2 that indicates that an adult is seated on a dry seat and the point P3 that indicates that no adult is seated on the seat that is wetted with salt water are positioned close to each other. However, the water content L of the point P3 is much larger than the content of the point P2, as shown in FIG. 10, where various values of the conductance on a line E-E or of the same conductance Re are plotted. In other words, the points P3 and P2 can be easily judged by comparing the contents L of the points P2 and P3 with a threshold line (dashed line) $T_{IL}$.

When the susceptance Im is located in an area between the origin and a preset point G, the threshold value of the threshold line $T_{IL}$ is 0. On the other hand, the threshold value of the threshold line $T_{IL}$ increases as the susceptance Im increases.

If the water content L is smaller than the threshold line, it is judged that the susceptance Im is changed by an adult who is seated on the seat. For example, the water content L at the point P2, which indicates that an adult is seated on the seat that is dry, is smaller than the threshold line $T_{IL}$.

On the other hand, it is judged that no adult but CRS is seated on the seat, because the water content L at the point P1 is larger than the threshold line $T_{IL}$. Further, because the water content L at the point P3 is larger than the threshold line $T_{IL}$, it is judged that no adult but CRS is seated on the seat that is wetted with salt water.

In the case where the seat is wetted with salt water, as the water content L increases the susceptance Im increases. However, the judgment can be made correctly because the threshold value increases as the susceptance Im becomes larger.

Various values of the conductance Re on a dashed line F-F or of the same susceptance shown in FIG. 9 are plotted in FIG. 11. It is understood that the threshold value increases along the threshold line $T_{RL}$ as the value of the conductance Re becomes larger. As indicated by the arrow line B in FIGS. 7 and 9, the value of the conductance Re increases as the water content L increases, although the value of the susceptance Im does not increase. In other words, the values of the conductance Re and the water content L increase as the content of the fresh water increases when the susceptance Im has a certain value. Thus, when an adult is seated on the seat that is wetted with fresh water, the water content L falls below the threshold line $T_{RL}$.

The white (or blank) bar P4 in FIG. 11 indicates a value of the water content L when no adult but CRS is seated on a seat that is wetted with salt water. That is, this value of the water content L is located at a cross point (not shown) of the extension of the arrow line C and the dashed line F-F in FIG. 9. It is understood that the water content L that is indicated by the white bar P4 is much higher than the threshold line $T_{RL}$ so that "vacant seat or CRS" can be clearly judged.

As shown in FIG. 9, the threshold line $T_{RL}$ is included in a threshold plane $T_{RIL}$ that discriminates a seat occupied by an adult, which is indicated blacken (or solid) bars located below the threshold plane $T_{RIL}$, from a vacant seat or seat with a CRS, which is indicated by white bars located above the threshold plane $T_{RIL}$. The judging section 8 judges the state of the seat by comparing the value of Re, Im and L with the threshold plane $T_{RIL}$. For example, the judging section 8 judges that an adult is seated if the water content L, which is estimated by the water content estimating section 7, is smaller than a value on the threshold plane $T_{RIL}$ at the first admittance $Y_1$, which is calculated by the real-imaginary component separating section 6.

The water content L can be calculated by using an orthogonal coordinate graph in which a vacant dry seat is set at the origin thereof.

Assuming that the second admittance (Re, Im) of the vacant dry seat is (Re$_0$, Im$_0$), the water content L is expressed as follows.

$$L = \{(Re-Re_0)^2 + (Im-Im_0)^2\}^{1/2}$$

At step S106, the result of judgment is transmitted to the airbag ECU 16 via a communication I/F. Thereafter, the steps 1-6 are repeated.

The airbag unit 17 is controlled according to the result of judgment. For example, if the result indicates that an adult is seated on a seat, the airbag ECU 16 permit operation of the airbag unit 17 so that the airbag can expand when a collision is detected. If the seat is vacant, or a CRS is seated thereon, the airbag ECU 16 forbids the operation of the airbag unit 17.

The passenger detection system 100 may include an alarm. If the electrodes are short-circuited due to a much amount of water covering the seat, a driver or a passenger can recognize a trouble by the alarm.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims.

Accordingly, the description of the present invention is to be regarded in an illustrative, rather than a restrictive, sense.

What is claimed is:

1. An electrostatic seat occupant detection system of a vehicle having a vehicle body and a seat, the electrostatic seat occupant detection system comprising:
    an antenna unit that includes a main electrode and a sub-electrode disposed side by side;
    an electric power source for supplying AC voltage to the antenna unit;
    a switch unit for switching supply of the AC voltage to the antenna unit to form one of a first electric field between the vehicle body and the main electrode thereby providing a seat-occupant detecting mode and a second electric field between the main electrode and the sub-electrode thereby providing a wet condition detecting mode; and
    a seat-occupant detecting ECU, wherein the seat-occupant detecting ECU comprises:
    an admittance calculating section that calculates a first admittance of the first electric field and a second admittance of the second electric field;
    a conductance-susceptance separating section that separates conductance of the first and second admittances from the susceptance of the first and second admittances;
    a water content estimating section that estimates an amount of water content of the seat based on the conductance and the susceptance of the second admittance; and
    a judging section that judges whether a seat occupant is present or not based on the conductance and susceptance of the first admittance and the estimated amount of the water content of the seat, wherein the judging section provides a threshold plane that is a function of the conductance and the susceptance of the first admittance and judges that an adult is seated on the seat when the amount of water content estimated by the water content estimating section falls below the threshold plane.

2. An electrostatic seat occupant detection system as in claim 1, wherein assuming that: the amount of water content is L; the conductance of the second admittance is Re; and the susceptance of the second admittance is Im, the amount of water content L is calculated according to the following expression: $L=(Re^2+Im^2)^{1/2}$.

3. An electrostatic seat occupant detection system as in claim 1, wherein:
the seat includes a seat frame;
the antenna unit further includes a guard electrode disposed between the seat-cushion frame and main electrode so as to confront the main electrode; and
the guard electrode is arranged to have the same potential level as the main electrode.

4. A passenger protection system comprising the electrostatic seat occupant detection system as in claim 1, an airbag ECU and an airbag unit, wherein the airbag ECU operates the airbag unit according to the result of judgment of the judging section.

* * * * *